United States Patent [19]

Ashton et al.

[11] 3,902,944
[45] Sept. 2, 1975

[54] NONCIRCULAR FILAMENT WOUND ARTICLE OF MANUFACTURE AND METHOD OF MAKING SAME

[75] Inventors: Larry J. Ashton, Long Beach; Dale P. Abildskov, San Pedro, both of Calif.

[73] Assignee: Fiber Science, Inc., Gardena, Calif.

[22] Filed: Feb. 14, 1974

[21] Appl. No.: 442,391

[52] U.S. Cl. ............... 156/156; 156/175; 156/245; 156/267; 428/36
[51] Int. Cl.² .......................................... B65C 3/26
[58] Field of Search .......... 156/172, 173, 191, 194, 156/245, 175, 156

[56] References Cited
UNITED STATES PATENTS

| | | | |
|---|---|---|---|
| 2,862,541 | 12/1958 | Brink | 156/172 |
| 2,984,870 | 5/1961 | Warnken | 156/165 |
| 3,138,506 | 6/1964 | Ross | 156/156 |
| 3,623,928 | 11/1971 | Wincklhofer et al. | 156/180 |
| 3,674,394 | 7/1972 | Wiltshire | 425/389 |
| 3,700,519 | 10/1972 | Carter | 156/173 |
| 3,733,233 | 5/1973 | Griffiths | 156/173 |
| 3,764,641 | 10/1973 | Ash | 156/245 |

Primary Examiner—George F. Lesmes
Assistant Examiner—William R. Dixon, Jr.
Attorney, Agent, or Firm—Fulwider, Patton, Rieber, Lee & Utecht

[57] ABSTRACT

There is disclosed an article of manufacture having a hollow structure with a noncircular cross sectional shape and comprising a plurality of layers of continuously wound filaments of a fibrous reinforcing material. The windings of filaments in any layer are substantially parallel and the filaments in adjacent layers lie along traversing directions. The filaments and layers of filament windings are cemented into a single unitary structure by a bonding resin. The aforedescribed structure is formed in a modified, continuous-filament winding process employing a winding mandrel formed by mounting circular end plates on shaft means, placing an elastic container between the opposed faces of the end plates, and securing flexible sheet material about the periphery of the end plates and extending therebetween to define the mandrel. A positive differential fluid pressure is established in the mandrel and the latter is rotated while a continuous filament of fibrous reinforcement material is wrapped about the mandrel in circular and/or helical paths by guiding the filament in a mandrel end-to-end traversing path to apply a plurality of layers of circumferentially and/or helically wound filament thereon. The filaments are embedded in a bonding resin and the mandrel is collapsed to release the continuous-filament wrapping as a flexible sheath. The flexible sheath is placed in a mold cavity bearing die faces with an intaglio form of the exterior surface of the article of manufacture and fluid pressure is applied to the elastic container to expand the sheath into a surface-conforming contact with the die faces of the mold and the bonding resin is then cured to cement the sheath into the desired hollow structure which is removed from the mold as the article of manufacture.

15 Claims, 8 Drawing Figures

NONCIRCULAR FILAMENT WOUND ARTICLE OF MANUFACTURE AND METHOD OF MAKING SAME

BACKGROUND OF THE INVENTION

1. Field of the Invention

This invention relates to fiber-reinforced plastics and, in particular, to a fiber-reinforced plastic article of manufacture having great strength and durability and to an inexpensive and facile method of manufacturing such article.

2. Description of the Prior Art

Fiber-reinforced plastics are well-known and used for many purposes. Typically, the reinforcing fiber used in plastics is a woven fabric of the fibrous reinforcing material. The manufacture of articles using woven fabrics is generally tedious and requires a considerable amount of hand labor in applying the woven fabric to a mold and coating the fabric with the bonding resin. Recent innovations in fiber-reinforced plastics have employed chopped strands of the fiber which can be applied with special application tools to minimize the amount of hand labor required in the manufacture of articles of fiber reinforced plastics. In both of these techniques, however, the ultimate strength of the reinforcing fiber is not achieved in the final product.

There has been developed a continuous-filament winding process for the manufacture of articles of circular cross section in which the maximum strengths of reinforcing fibers are utilized to obtain a very strong and light product. This process has been typically employed for the fabrication of pressure vessels and generally comprises winding continuous-filaments of the fibrous reinforcing material, about a mandrel in helical windings to form a plurality of layers of filaments with the windings of filaments in adjacent layers being diagonally oriented. The wound product is embedded with the bonding resin, typically an epoxide or polyester resin, which is cured to cement the product into a rigid and strong vessel formed of fiber-reinforced plastics. Because the fibers in this product are continuous and are load-bearing in tension, very high strength products can be achieved by this manufacture. Because the filaments must be applied with a circular, or helical, direction on the mandrel, this manufacture lends itself readily only to the manufacture of articles having surfaces of revolution, i.e., those having a circular cross section.

BRIEF DESCRIPTION OF THE INVENTION

We have now developed a method which permits the continuous-filament winding process to be employed for the manufacture of articles of noncircular cross section and have thereby developed the manufacture of articles of hollow structure of great strength and light weight. In a specific application of this manufacture, we have developed the manufacture of lightweight and strong airfoil sections ideally suited for aerodynamic applications, e.g., as helicopter blades, wing and tail surfaces of aircraft, etc.

Our invention comprises the use, in a filament winding process, of a mandrel which is formed from circular end plates having a flexible sheet material extending therebetween to define the arcuate winding surface of the mandrel. Disposed within the mandrel so defined is a container of an elastometric material which can be connected to a source of fluid pressure so that the container can be inflated to a necessary pressure for maintaining the arcuate contour of the flexible sheet material during the winding process. The filaments of fibrous reinforcing material are applied to the mandrel using techniques of the continuous-filament winding process in which the mandrel is rotated and wound while the filaments are guided in an end-to-end mandrel-traversing motion across the mandrel to apply the filaments thereon in circular or helical windings. The windings in each thickness of winding are diagonally oriented to the windings in adjacent thicknesses and each layer of windings comprises a down and back pass or thickness of such windings. After a plurality of such layers have been applied to the surface of the mandrel and embedded in resin, the mandrel is ready for shaping into the desired article of manufacture having a noncircular cross section.

Conventional filament bonding resins can be employed and the resins can be pre-coated on the surface of the mandrel, can be continuously applied to the surface of the filaments as they are applied to the mandrel, or can be applied to the wound mandrel after all of the windings have been applied thereto. Any of these or all of these techniques can be employed for the application of the resin.

After the mandrel has been wound with the filaments of the fibrous reinforcing material and the latter has been thoroughly impregnated or coated with the bonding resin, the wound sheet about the mandrel is collapsed into a flexible sheathing. The flexible sheathing is then placed in a mold cavity bearing die faces having the intaglio pattern of the desired article of manufacture. The mold cavity is closed and a differential positive pressure is established within the sheathing to expand the sheathing outwardly into contact and conformity with the die faces of the mold cavity. Alternatively, the mold cavity can be evacuated, e.g., by placing the mold in an autoclave which is evacuated, and the higher internal pressure within the sheathing will expand the sheathing into contact with the die faces. The bonding resin is then cured by heat or catalyst, or both, to cement the sheathing into a load-bearing structure having a noncircular cross section.

The objects and advantages of the present invention will become apparent when considered in conjunction with the following brief description of the drawings.

DESCRIPTION OF THE PREFERRED EMBODIMENT

Figure 1:
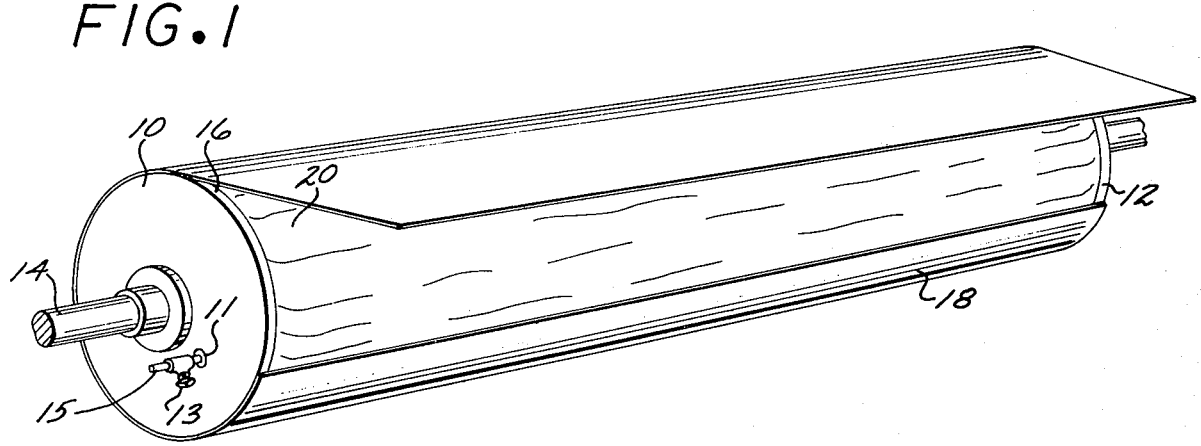
FIG. 1 illustrates the fabrication of the mandrel.

FIG. 1 illustrates the fabrication of the mandrel used in our modification of the continuous-filament winding process. This mandrel is formed from two end plates, 10 and 12, which are mounted upon shaft means 14 which can be separate stub shafts for each end plate or, as illustrated, can be a single shaft extending the length of the mandrel. The end plates bear a peripheral flat sealing edge 16 and a sheet 18, which is formed of a continuous flexible sheet material, is laid between the end plates and secured thereto by suitable means, e.g., stapling, tacking, cementing, band clamping, etc. The interior of the mandrel should be capable of sustaining a positive differential pressure of fluid, typically of air. To this end, the sheet 18 can be sealed about the end plates to form an air-tight cylinder. If desired, an envelope or container 20 of an elastometric material can also be placed within the mandrel, between end plates 10 and 12 before sheet 18 is secured thereto. Means are also provided for the controlled adjustability of fluid pressure in the mandrel. As shown, this can be a fitting 11 in end plate 10 which bears a pressure regulator 13 and a short conduit 15 that can be connected to a source of a pressurizing fluid such as a gas at superatmospheric pressures. When an envelope 20 is used, it can be connected to fitting 11 on the inside face of plate 10 or the plate could simply have an aperture through which the fill neck of the envelope could be passed.

Figure 2:
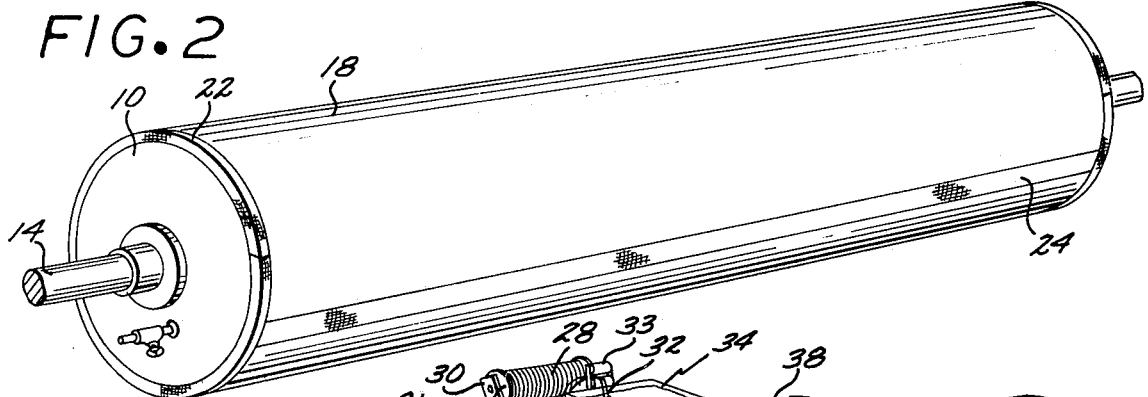
FIG. 2 illustrates the mandrel as used in the filament winding process.

FIG. 2 illustrates the assembled mandrel. In this view, a flexible tape 22 has been applied over the edges of the sheet material and about the periphery of the end plates to secure the sheet to the end plates and to seal the sheet 18 thereto. A longitudinal strip 24 of the tape is also laid along the longitudinal joint of the sheet material to secure the flexible sheet material in the arcuate-surface mandrel depicted by the FIG. 2.

Figure 3:
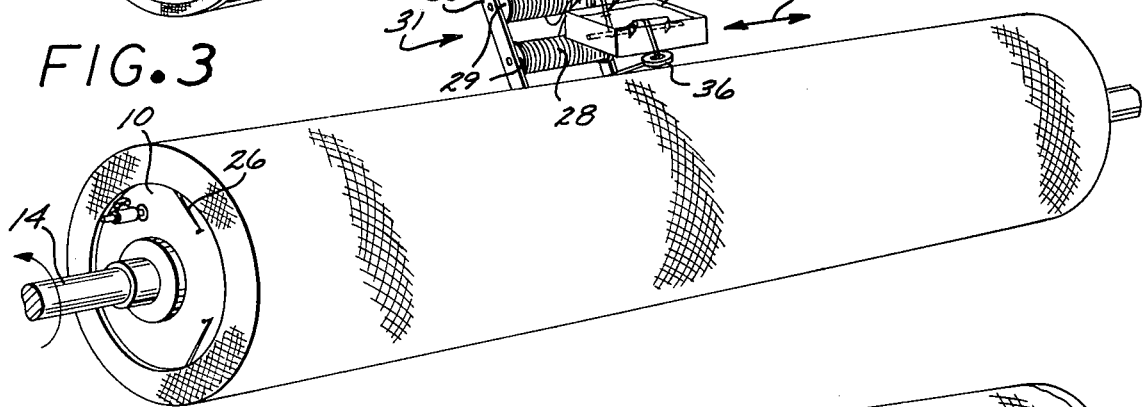
FIG. 3 illustrates the winding of the mandrel.

The mandrel is used in a continuous-filament winding process which is generally illustrated in FIG. 3. The filament winding process is well-established in the art of construction of pressure vessels and the technology of such construction is directly applicable in our method. As shown in FIG. 3, the mandrel is rotated by driving shaft 14. One end, 26, of continuous filaments of a fibrous reinforcing material is secured to end plate 10 and the yarn is wrapped or wound about the mandrel. Sufficient positive differential pressure is applied to the interior of the mandrel, by application of fluid pressure to a sealed mandrel or to envelope 20 within the mandrel, to maintain the arcuate surface of the mandrel. The amount of differential pressure can be from 0.5 to about 25 p.s.i. The pressure can be gradually increased as the winding progresses and in a typical application could be increased from about 0.5 p.s.i. initial pressure to about 10 p.s.i at the completion of the winding. The filaments supplied from one or more rovings 28 on spools or bobbins 29 are mounted in creel 30 of the winding apparatus which is mounted on carriage 31. The filaments 32 are passed from the creel 30 through one or more baths of liquid, such as that contained in vessel 34, and then through guide means 36 and onto the mandrel as the latter is rotated about its axis. The mandrel can be rotated at a speed of from 1 to about 250, typically from 30 to about 150 revolutions per minute.

The filaments are applied at a predetermined tension typically from 0.1 to about 10, preferably from 0.5 to about 5 pounds per roving. This is accomplished by passing the filaments through tensioning means such as rollers 33. The carriage 31 is moved in a longitudinal direction in a mandrel traversing path as shown by the double-headed arrow 38. When the assembly reaches the end of the mandrel, its direction of movement is reversed to apply the remaining half layer of the yarns. The velocity of the carriage can be from about 0.5 to 5 feet per second, typically about 3 feet per second. This velocity is usually limited in a wet winding process by the tendency of the fiber to sling off the resin at higher velocities. When pre-preg or post-preg applications are used, i.e., when the resin is applied before or after the winding rather than onto the fiber, higher carriage speeds could, of course, be used.

The process, as thus described, results in the application of the filaments of fibrous reinforcing material onto the mandrel at helix angles, which are measured on the mandrel between its axis and the band path of the filaments, from about 5° to about 90°. The filaments are applied in various patterns including: the helical, hoop or polar wrapping patterns as used in the conventional winding process. It is preferred to apply some bands of filaments at 0°–5° helix angles, i.e., longitudinally or substantially longitudinally on the mandrel. This can be accomplished by manually applying the fibers about the mandrel.

The liquid bath, or baths, within one or more containers 34 contains treating agents or additives for filaments of fibrous reinforcing material to insure maximum bonding of the fibers in the final product.

The bonding resin is incorporated on the mandrel to embed the yarn windings about the mandrel in a continuous film or coating of resin. The resin can be applied to the plastic sheet 18 before starting the winding process or the resin can be applied onto the wound mandrel, after all of the windings have been applied thereto. In the preferred embodiment, the resin is coated onto the filaments of the fibrous reinforcing material while they are being applied to the mandrel. In this embodiment, the filaments 32 would be passed through a bath of the resin which could be contained within vessel 34 immediately before passing through guide 36. Sufficient resin can be wetted onto and retained on the surface of the rovings when the resin viscosity is maintained between about 1,000 and 6,000, preferably between about 2,000 and 3,000, centipoises, at the application temperature. Resins of greater viscosities at ambient temperature can be used simply by warming or heating the resin in vessel 34, care being taken, or course, to limit the residence time of the resin in the vessel to avoid initiating the cure hardening of the resin.

Figure 4:
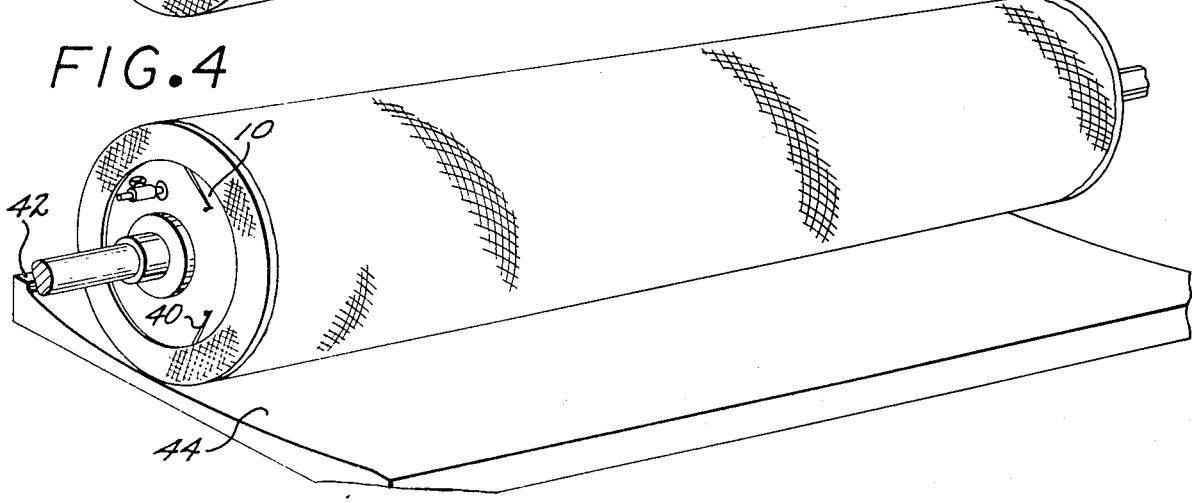
FIG. 4 illustrates the wound mandrel supported over a die face of a mold cavity.

After a plurality of layers, generally from one to about 50, preferably from three to about ten, and most preferably about six or seven, of the windings have been applied to the mandrel, the winding process is discontinued and the ends of the filaments 40 are secured to one of the end plates, such as 10, as illustrated in FIG. 4. The mandrel is then removed from the spinning apparatus and rested on the lower half 42 of a mold. The upper surface above mold half 42 bears a die face 44 which comprises an intaglio pattern of the surface desired in the finished article of manufacture. As illustrated in FIG. 4, the desired article of manufacture has an airfoil cross section and half 42 of the mold carries a die face 44 of one side of the desired airfoil shape.

Figure 5:
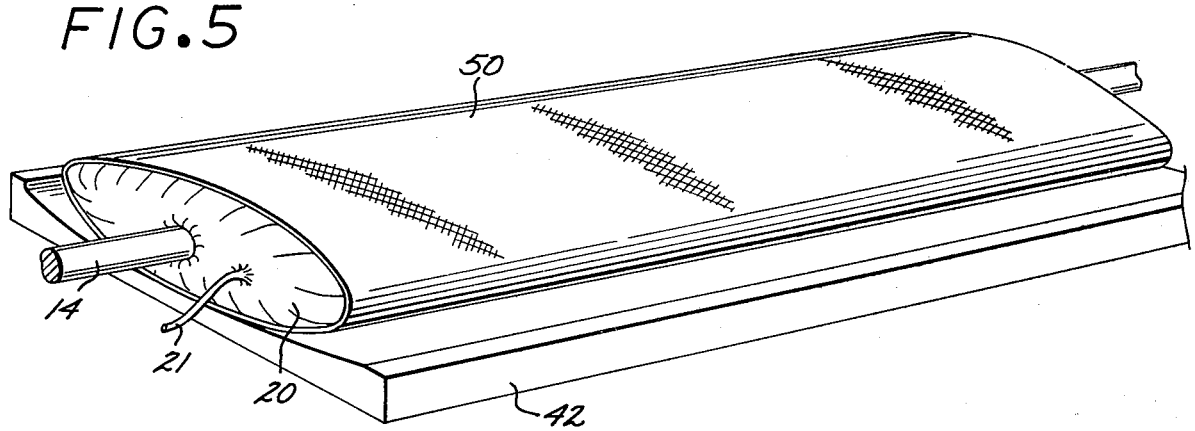
FIG. 5 illustrates the flexible sheath formed by removal of the end plates of the mandrel resting on the die face of the mold cavity.

FIG. 5 illustrates the wound mandrel which has been collapsed into a flexible sheathing 50. This can be accomplished by severing end plates 10 and 12 from the mandrel shown in FIG. 4 by cutting about the periphery of the mandrel at each end plate. The mandrel is cut through the windings of continuous filaments and through the flexible sheet 18 to permit the sheathing 50 to collapse about the flexible container 20. The fill neck 21 of envelope 20 is at one end of the envelope and can be secured to any controlled source of fluid pressure for subsequent forming steps. Typically, a pressured gas, e.g., air, is used. If desired, however, foam generating liquids could be used, such as foamed-in-place polyurethane resins if the final product is to be filled with a solid polyurethane foam. In some applications it may be more desirable to form the mandrel with a greater length than the mold cavity to avoid the cutting of the sheathing from the end plates 10 and 12, when rigid end plates are used. Alternatively, flexible end plates can be used, avoiding the need to cut the sheathing from the end plates before molding or the need to use a mandrel of greater length. In these methods, the envelope 20 can also be eliminated by sealing sheet 18 and forming an air-tight mandrel so that the positive differential pressure can be established within the mandrel directly. The end plates can be removed by trimming the excess sheathing from the mold or from the molded article of manufacture.

When a single, continuous shaft 14 is employed in assembly of the mandrel, the shaft can remain within the sheathing 50 as shown in FIG. 5 and can be used to facilitate handling of the sheathing.

Figure 6:
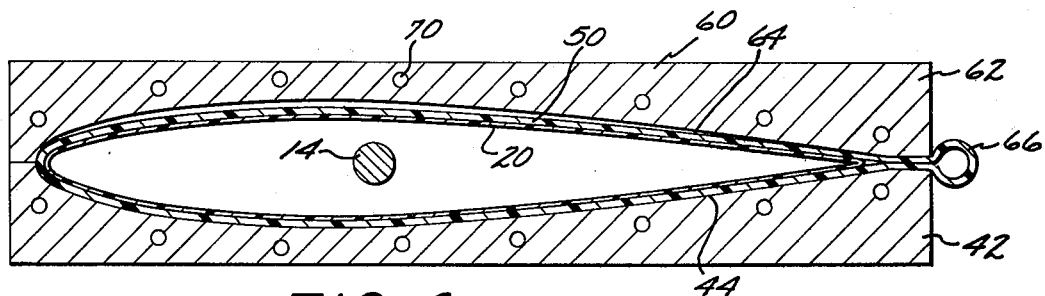
FIG. 6 is a cross sectional view through a mold containing the flexible sheath.

The sheathing 50 is then encased by a mold 60 which is shown in FIG. 6. This mold comprises lower half 42 and upper half 62, each of which bear die faces 44 and 64 that have an intaglio pattern of the desired article of manufacture. As shown in the illustration, the mold cavity defines an airfoil shape with opposed die faces 64 and 44. Preferably, the sheathing 50 is slightly oversized for the mold cavity and the excess portion of the sheathing is looped outside of the mold cavity along one edge thereof as illustrated by loop 66.

Figure 7:
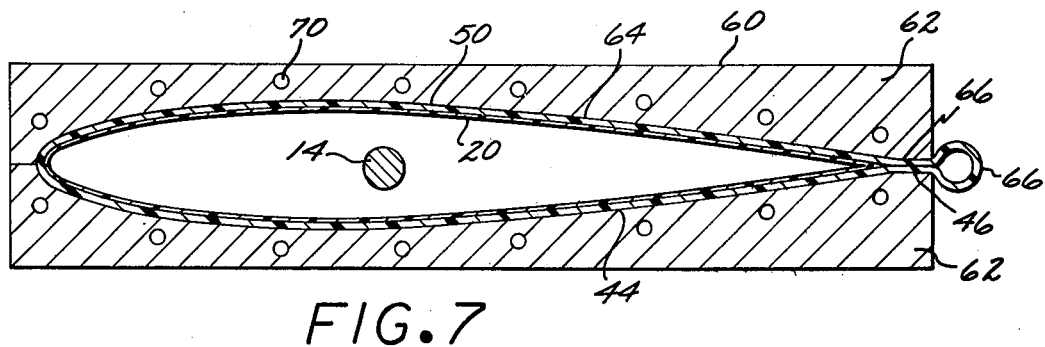
FIG. 7 is a similar cross sectional view after expansion of the flexible sheath.

The mold cavity is closed and the halves are locked securely into position by retaining or clamp means (not shown), and a positive differential pressure is established within envelope 20 or within the mandrel, directly, when the end plates are not removed. In the illustrated method, this can be established by applying fluid pressure to envelope 20 within the sheathing 50. The positive differential pressure in the interior of envelope 20 expands the envelope outwardly and forces sheathing 50 into contour-conforming contact with the interior die faces of the mold cavity. This is illustrated in FIG. 7, where the sheathing 50 can be seen to be in conforming contact with the entirety of mold faces 44 and 64 of mold 60.

Since the sheathing 50 is generally and preferably formed of nonelastic, fibrous material, the necessary material for expansion of the sheathing into contact with the mold faces will be obtained by the drawing of the material from loop 66 through the groove formed by the mating edges 66 and 46 of mold halves 42 and 62.

The bonding resin is thereafter cured into a hardened condition by the application of heat or a suitable catalyst. Generally, the resin is cured by the application of heat to the interior of mold 60. To accomplish the application of heat, the mold halves 42 and 62 can contain a plurality of internal passageways 70 through which a suitable heat transfer medium, e.g., steam, can be passed to heat the mold to resin curing temperatures, typically from ambient temperature, e.g., about 75° to about 400° F., preferably from 100° to about 225° F. The application of this heat is continued for a sufficient time of resin curing, e.g., from 10 minutes to about 7 days, preferably from 60 to about 300 minutes as required for the particular resin and fibrous reinforcement system employed in fabrication of the article.

Figure 8:
FIG. 8 is a cross section of the finished article of manufacture having a noncircular airfoil shape.

After the resin has cured to a hardened condition, the mold 60 can be opened and the formed article of manufacture can be removed therefrom. When present, the envelope 20 can be collapsed and removed from the interior of the article along with shaft 14. The loop of excess material 66 can be cut from the article to produce the finished product shown in FIG. 8. The adjacent surfaces of the sheathing 50 which pass through the groove between edges 46 and 66 of the mold halves will be cemented into a secure lap joint 82 as shown in FIG. 8. The finished article of manufacture 80 has a noncircular cross section as illustrated by the airfoil cross section of FIG. 8. In an illustrated typical embodiment, the airfoil section so formed has a cord of 40 inches, and a NASA profile number 0015 and is suitable with internal bracing, for use as a helicopter blade.

SUITABLE FIBROUS MATERIALS

Any available fiber can be used as a reinforcement for resins used in the process. Examples of available fibers include fibers of rayon, cotton, silk, polyesters, etc. An example of a suitable organic fiber is Kevlar 49 which has a density of about 0.5 grams per cubic centimeter, a tensile strength of 400,000 p.s.i. and a Young's Modulus of 19 million p.s.i. Most desirably, however, fibers are employed which have relatively high tensile strength such as glass or carbon fibers. Type S glass fibers can be used and are preferred for their greater strength over Type E fibers. Typically the Type S fibers have tensile strength from 3 to $7 \times 10^5$ p.s.i. and Young's Modulus of about 12 to $13 \times 10^6$ p.s.i. The Type S fibers are obtained from a glass melt of silica, alumina and magnesia.

In their manufacture, the glass filaments are usually sized immediately upon formation to avoid any mechanical damage. A textile sizing, which consists of a dextrinised starch and emulsified vegetable oil, is sometimes applied. More commonly, a plastics sizing is applied which comprises a polyvinyl acetate base, a plasticizer and a resin coupling agent. When the textile sizing is present, it is necessary to remove the sizing from the filaments before their application since the textile sizing is generally not compatible with the bonding resins. When the plastics sizing is employed, the filaments can be directly applied and embedded with the bonding resin since they are compatible with the commonly used bonding resins.

When necessary, the filaments can be de-sized by carmelization which comprises a heat treatment to volatilize the sizing and carbonize the starch, thereby reducing the residual sizing content to about 0.6%. The sizing can also be removed by passing the filaments through a scouring bath to remove the organic material and reduce the residual sizing to below 0.3%. A combination of both treatments can also be used where the filaments are passed through the aqueous bath and then passed through an oven at a temperature of about 300°–350° C.

The filaments of glass fibers have diameters which range from about 0.0045 to about 0.015 millimeters in diameter. As described herein, the term filaments has been used generically to refer to a single filament or to yarns or rovings of a plurality of filaments. The filaments can be used as yarns which are formed from a plurality of filament strands by twisting and plying the strands or as rovings which are bands of untwisted strands. The latter are preferred. The yarn is commonly designated by count which is the weight of the yarn per unit length and typical yarn counts are from 2.75 to 135 grams per kilometer of yarn length. The number of filaments which are combined into a strand of yarn or into a roving range from about 50 to about 250 filaments. The yarns or rovings are supplied in a spool or a bobbin with from 1 to about 300 ends which are wound into a cheese or cone shape. The rovings unwind during their application as a band of parallel, multiple filaments which are applied to the mandrel as a band.

Carbon base fibers can also be employed and are preferred because of their high tensile strengths. The carbon base fibers are prepared from filaments of carbonaceous materials which are heated to high temperatures under carefully controlled conditions to convert the carbonaceous material into substantially pure carbon. Rayon is one of the most commonly used carbonaceous material for preparation of the carbon and graphite fibers. The fibers are commonly referred to as partially carbonized, carbonized or graphatized, depending upon the severity of the heat treatment. The partially carbonized fibers are obtained by treatment of fibers at temperatures from 1300° to 1700° F. and have a carbon content up to about 90 weight percent. Fibers having carbon contents about 90 weight percent are obtained by carbonization at slightly higher temperatures and are generally referred to as carbonized fibers, while fibers which have been heated to graphatizing temperatures, i.e., temperatures from 4900° to 5400° F. are referred to as graphatized fibers. The commercially available carbon or graphite fibers have tensile strengths of about 1 to about $5 \times 10^5$ p.s.i. and Young's Modulus of $6-100 \times 10^6$ p.s.i. The fibers have densities of about 1.4 grams per cubic centimeter, although fibers having a high content of graphitic structure will have densities up to about 2 grams per cubic centimeter. The carbon base fibers are available as rovings similar to those described for the glass fibers, however, typically as a single filament wound on a spool.

RESIN SYSTEMS

The resins that are commonly used in the manufacture of fiber-reinforced plastics are generally resins which can be cured into a hardened condition with low molding pressures, typically less than about 200 p.s.i. and preferably cured at atmospheric pressure. The two most commonly employed systems are based on unsaturated polyester resins or epoxide resins. The polyester resins are copolymers of styrene and unsaturated polyesters and are supplied as a solution of linear unsaturated polyesters in styrene. The base polyesters are prepared by condensing phthalic and/or maleic anhydrides with propylene glycol and some diethylene glycol. The condensation is usually performed without a catalyst and at a temperature of about 200° C. for a period of time of about 10 hours to obtain a product with an acid neutralization value of about 30-30 mg. KOH per gram. Water formed during the condensation is distilled from the product and the unsaturated polyester so obtained is stabilized with a slight amount of phenol and dissolved in styrene to obtain the viscous liquid which is supplied to the fabricator as a polyester resin. In some resins, a part of the styrene monomer is replaced with methylmethacrylate to give weathering properties to the final product. The polyester resin is blended with a catalyst accelerator in most applications and suitable peroxide catalysts can be used, such as benzoyl peroxide, 1-hydroxycyclohexyl hydro-peroxide-1, etc.

Another commonly used resin system for manufacture of fiber reinforced plastics is epoxide resins. These resins, which are preferred for their greater strength, are obtained by condensing diphenylolpropane with a molar excess of epichlorhydrin in the presence of sodium hydroxide as a catalyst and ethanol solvent. The excess epichlorhydrin and the alcohol solvent are distilled off and the sodium hydroxide is removed by washing. The epoxide resins are obtained as a low-molecular-weight, linear polycondensates. The epoxide resins require a hardening agent to react with the epoxy or hydroxyl groups and form a cross-linked hardened resin. Typically, aliphatic polyamines and acid anhydrides are used as hardening agents. The amines most commonly employed are diethylene triamine, triethylene tetramine or tetraethylene pentamine which are employed in amounts comprising from 10 to 15% of the epoxy resin. A typically employed acid anhydride is phthalic anhydride which is used in an amount from 40 to about 50% of the epoxy resin.

Other resins which can be used include polyimide resins and phenolic resins, the former being particularly suited for high temperature applications.

Obviously, many modifications and variations of the present invention may be made with regard to the foregoing detailed description without departing from the spirit of the invention.

We claim:

1. The method of forming a hollow structure having a shape with a noncircular cross section which comprises:

preparing a winding mandrel by mounting circular end plates on shaft means, securing flexible sheet material about the periphery of said end plates and extending therebetween, forming a sealed envelope within said mandrel and establishing a positive differential fluid pressure therein to define a mandrel having a circular cross section and an arcuate exterior surface;

preparing a continuous filament wrapping about said winding mandrel by rotating said mandrel and winding filaments of fibrous reinforcement material in a helical path about said mandrel by guiding said filaments in a mandrel end-to-end traversing path to apply a plurality of layers of circumferentially and helically wound filaments thereon with a helix angle from 0° to about 90°;

controlling the positive differential fluid pressure in said sealed envelope to maintain the arcuate exterior surface of said mandrel during said winding;

embedding said layers of wound filaments in a bonding resin;

relieving said positive differential pressure to collapse said mandrel and release said wrapping as a flexible sheathing of continuous filament wrapping;

placing said flexible sheathing of continuous filament wrapping in a mold cavity bearing die faces with an intaglio form of the exterior surface of said hollow structure of noncircular cross section;

establishing a positive differential pressure in the interior of said flexible sheathing of continuous filament wrapping to expand said sheathing into surface-conforming contact with said die faces;

curing said bonding resin to bond said sheathing into said hollow structure;

trimming said end plates and said flexible sheathing; and removing said hollow shape from said mold.

2. The method of claim 1 wherein said filaments comprise wound and twisted filaments of glass fibers.

3. The method of claim 1 wherein said filaments comprise twisted strands of carbon fibers.

4. The method of claim 1 wherein said bonding resin is a polyester resin.

5. The method of claim 1 wherein said bonding resin is an epoxide resin.

6. The method of claim 4 wherein said resin is cured by heating said sheathing in said mold cavity to a temperature from 75° to 400° F. for a period of 10 minutes to 7 days.

7. The method of claim 5 wherein said resin is cured by heating said sheathing in said mold cavity to a temperature from 100° to 225° F. for a period of 60 to 300 minutes.

8. The method of claim 1 wherein said filaments are applied to said mandrel at a helix angle from 5° to 90°.

9. The method of claim 1 wherein said bonding resin is applied to said filaments by coating said resin on said filaments as the filaments are wound onto said mandrel.

10. The method of claim 1 wherein said filaments are wound on said mandrel at a tension of from 0.1 to 10 pounds per filament.

11. The method of claim 1 including the steps of placing a container of an elastomeric material within said mandrel to form said sealed envelope and removing said container from said hollow structure after said curing step.

12. The method of claim 1 wherein said step of trimming said end plates from said continuous filament wrapping is performed before said curing step.

13. The method of claim 1 wherein said flexible sheathing is sealed to said end plates to define said envelope and said end plates are trimmed from said sheathing after said curing step.

14. The method of claim 1 wherein said mold defines a hollow structure with an air foil cross section.

15. The method of claim 1 wherein said mold is formed by joining mold sections bearing die faces that mate together to form a mold cavity of an intaglio pattern of the desired article and wherein said sheathing of continuous filament wrapping is oversized for said cavity and the oversized portion thereof is looped outside said mold cavity along a mating edge of said mold sections.

* * * * *